T. W. SLUTZ.
TOOL FOR COLLAPSING AND EXPANDING SPLIT RIMS.
APPLICATION FILED SEPT. 22, 1919.
1,402,674.
Patented Jan. 3, 1922.
2 SHEETS—SHEET 1.
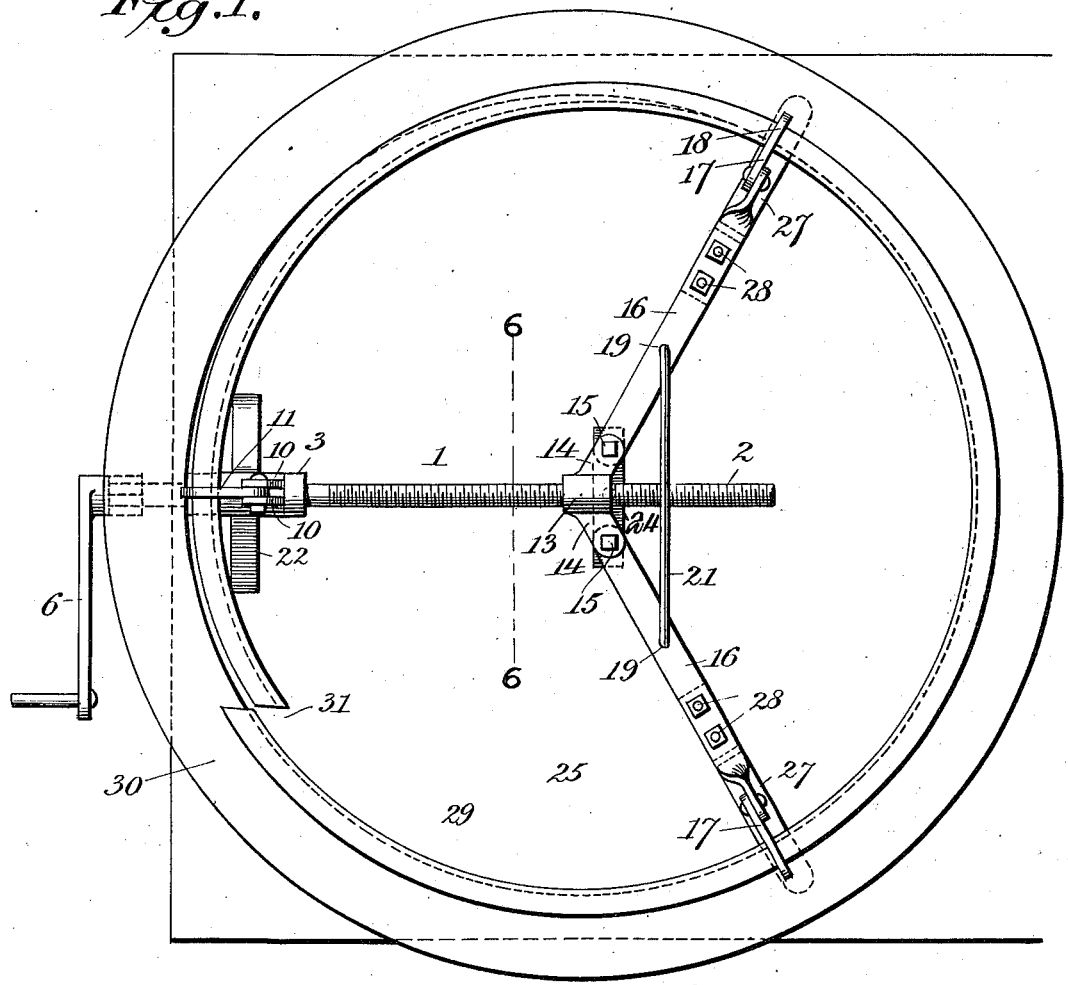
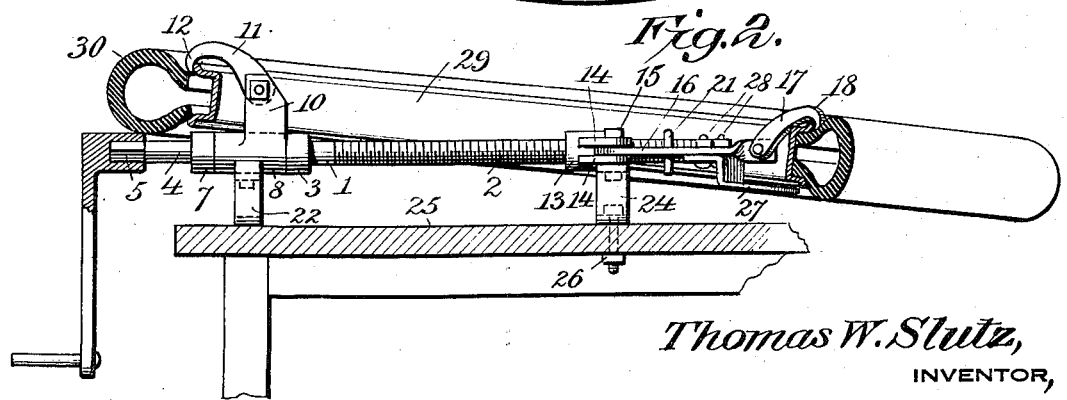
Thomas W. Slutz,
INVENTOR,
WITNESSES
Howard D. Orr.
P. T. Chapman.
BY
E. G. Siggers
ATTORNEY

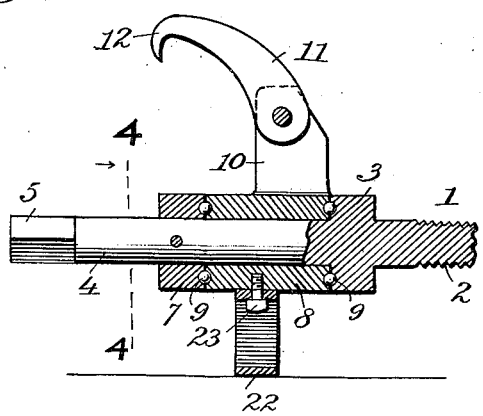
Fig. 3.
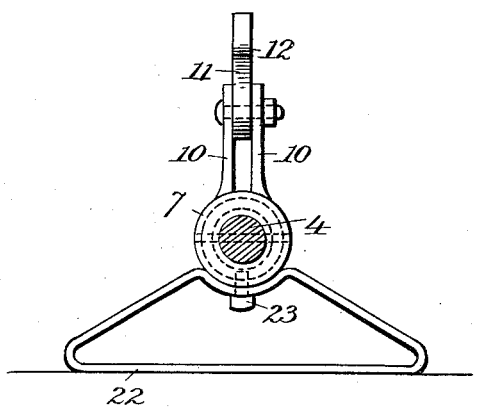
Fig. 4.
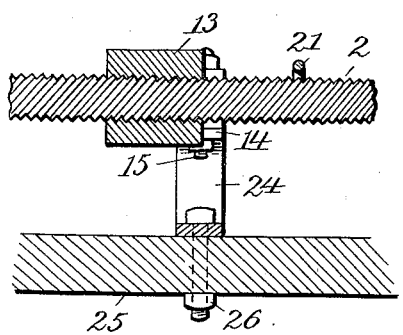
Fig. 5.
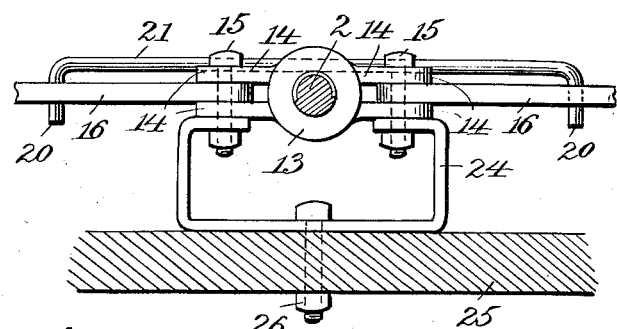
Fig. 6.
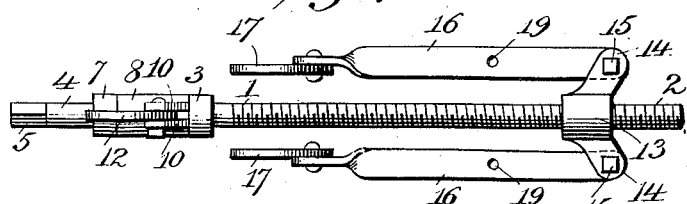
Fig. 7.
Fig. 8.

UNITED STATES PATENT OFFICE.

THOMAS WALTER SLUTZ, OF ST. PAUL, MINNESOTA.

TOOL FOR COLLAPSING AND EXPANDING SPLIT RIMS.

1,402,674.  Specification of Letters Patent.  Patented Jan. 3, 1922.

Application filed September 22, 1919. Serial No. 325,361.

*To all whom it may concern:*

Be it known that I, THOMAS W. SLUTZ, a citizen of the United States, residing at St. Paul, in the county of Ramsey and State of Minnesota, have invented new and useful Tools for Collapsing and Expanding Split Rims, of which the following is a specification.

This invention has reference to tools for collapsing and expanding split rims for automobile tires, and its object is to provide a tool by means of which split rims of various types may be collapsed in order to remove the pneumatic tire therefrom and may be expanded in order to be applied to the automobile wheel in the usual manner.

In accordance with the invention a three-point tool is provided with a single contracting and expanding member which may be of the screw type and which may be placed upon a suitable support either temporarily or permanently, the rim with the tire thereon being placed upon the tool with the rim engaged by appropriate members, whereupon such members may be brought toward each other in a manner to cause the collapsing of the rim after being unlocked, thus reducing the external diameter of the rim and releasing the tire. When it is desired to replace the tire the contracted rim permits the ready adjusting of the tire and then the parts of the tool are expanded, forcing the rim to spread and thus correspondingly expanding the rim until the usual lock will move into locking position.

The invention will be best understood from a consideration of the following detailed description taken in connection with the accompanying drawings forming part of this specification, with the understanding however, that the invention is not confined to any strict conformity with the showing of the drawings, but may be changed and modified so long as such changes and modifications mark no material departure from the salient features of the invention as expressed in the appended claims.

In the drawings:—

Figure 1 is a plan view of the rim tool showing the rim contracted ready to remove the tire.

Figure 2 is a side elevation with portions of the rim and tire in section.

Figure 3 is a longitudinal section of the crank end of the tool.

Figure 4 is a section on the line 4—4 of Figure 3.

Figure 5 is a section of a portion of the tool taken at an intermediate point.

Figure 6 is a section on the line 6—6 of Figure 1.

Figure 7 is a plan view of the tool folded to place in a tool box, certain parts being omitted.

Figure 8 is a detail view of a link used in connection with the tool.

Referring to the drawings, there is shown a frame having a main stem 1 in most part in the form of a screw-threaded rod or stem 2. Near one end the stem 1 is formed into a head 3 of greater diameter than the threaded rod 2, and beyond the head has a plain extension 4 terminating in a squared extremity 5, which extremity is designed to receive a crank handle 6 whereby the threaded stem may be rotated. It is not obligatory that the end 5 should be square for any non-circular shape will answer, the purpose being simply to permit the application of a crank to turn the stem or the removal of the crank for storage purposes. Fast to the extension 4 in spaced relation to the head 3 is a collar 7 between which and the head 3 the extension 4 carries a sleeve 8 with antifriction thrust bearings 9 interposed between the respective ends of the sleeve 8 and the head 3 and collar 7. Mounted on the sleeve 8 are spaced ears 10 between which there is pivoted a finger 11 terminating at the end remote from the ears in a hook 12.

Applied to the screw stem 2 is a nut 13 with pairs of spaced ears 14 on opposite sides. Pivoted to each pair of ears by a bolt 15 or otherwise is one end of a bar 16 carrying at the end remote from the nut a pivoted finger 17 terminating in a hook 18. There are two bars 16, consequently there are two hooks 18 so that the tool is provided with three hooks which may be placed about 120° apart. Although such particular spacing is not obligatory, a three-point engagement with the rim is essential. Each bar 16 is provided at an appropriate point with a perforation 19 to receive the bent ends 20 of a link 21, whereby the bars 16 may be held in determined relation to each other.

The instrument as so far described is capable of use in the form shown, but for some purposes it is convenient to have the instrument permanently mounted as on a bench in a garage or workshop. For this purpose, the sleeve 8 may have a foot or support 22 secured to it by a screw 23 or otherwise, the support being of an appropriate height. Secured to the nut 13, as for instance, by the bolts 15, is another foot or support 24 of a suitable height to rest upon a bench or support indicated in some of the figures of the drawings at 25, and made fast to the bench by a bolt 26 or in any other appropriate manner. Where the tool is to be mounted on a bench or other like support, each arm or bar 16 is provided near the end remote from the nut 13 with a bracket support 27 which may be in the form of a bar suitably angularly bent and secured to the bar 16 by bolts 28 or in other appropriate manner, whereby the bar 16 is elevated appropriately from the bench. In Figures 1 and 2 there is shown a split rim 29 carrying a pneumatic tire 30. These parts being of customary construction require no particular description and in practice may vary considerably. All split rims, however, have a joint 31 ordinarily locked together when the rim is in the normal expanded condition. In order to release the tire it is necessary to separate the rim at the joint and allow the ends to overlap to some extent so that the circumference of the rim where engaging the tire is lessened sufficiently to permit the tire to be easily removed from the rim. It is assumed, of course, that the rim is removed from the wheel preliminary to removing the tire from the rim. Then the rim with the tire thereon is placed upon the removing tool, and the screw is turned in the proper direction to expand the rim by bringing the ears or lugs 10 and the ends of the bars 16 into engagement with the inner face of the rim until the usual locking tongue is removed from the usual locking socket, whereupon the hooks 12 and 18 are engaged with the rim and the tool is contracted by turning the screw 2 in the proper direction, a screw-driver or other device being placed between the meeting ends of the rim so that such ends will spring past each other when the screw is turned in the proper direction to contract the rim. When the tire is replaced the already contracted rim is engaged between the ears 10 and outer ends of the bars 16 and the rim is again expanded with the tire encircling it until the tongue and groove parts of the lock once more engage.

The operation is expeditiously performed and the tire may be removed and replaced on the rim in short order and with but little effort, much less than is usually exerted in taking off and putting on the tire.

In Figure 7 the tool is shown folded so as to go into the tool box of an automobile, and hence the parts 22 and 24 have been omitted from this figure.

It will be understood that when expanding the rim, with lugs 10 and the ends of the bars 16 in contact with the inner face of the rim, the hooks 12 and 18 are swung backwardly on their pivots.

The invention of this application is generic to the invention disclosed in the application of David A. Davies, No. 444,527, filed February 12th, 1921.

What is claimed is:—

1. A tool for handling demountable tire rims, comprising a screw rod or stem having a tool receiving end, a sleeve secured against longitudinal movement on the rod adjacent to the tool-receiving end thereof, said sleeve having a part adapted to engage with the rim when expanding the latter, a hook carried by the sleeve and adapted to engage with one edge of the tire rim above the sleeve with the latter extending below the rim, the tool receiving end of the screw rod extending out from the sleeve beneath the tire and accessible at the periphery of the tire for the application of a turning implement or tool, a nut carried by the screw rod and movable lengthwise thereof when the screw rod is turned, bars in angular relation to the screw rod connected to opposite sides of the nut and of a length to approach and contact with the wheel rim when expanding the latter, and a hook carried by each bar for engaging the rim and in conjunction with the hook on the sleeve adapted to cause contraction of the rim by a three-point engagement with the latter.

2. A tool for handling demountable tire rims, comprising a rotatable screw rod or stem with one end formed for the application of a turning tool, a sleeve on the rod in which the latter is rotatable, ears on and projecting from the sleeve, a hook pivotally mounted in the ears, a nut on the threaded portion of the rod or stem and provided with projecting ears on opposite sides, bars pivoted between the ears and of a length to extend from the stem into approaching relation to the tire rim, and hooks each pivoted to the end of a respective bar remote from the nut, the tool also including a detachable link with ends adapted to engage the bars at intermediate points and hold the latter in fixed relation to each other with the bars diverging from the screw stem.

3. A tool for handling demountable tire rims comprising a screw stem, a sleeve mounted on the stem and in which the latter may rotate without moving the sleeve, said sleeve having projecting ears thereon, a hook carried by the ears, a nut with ears on opposite sides and applied to the screw stem, bars pivotally connected to the ears on opposite sides of the nut, a hook carried by each bar at the end remote from the nut, the several hooks being adapted to engage a wheel rim, and brackets or supports carried by the outer ends of the bars to in turn receive the corresponding portions of the rim.

4. A tool for handling demountable tire rims comprising a screw stem, a sleeve mounted on the stem and in which the latter may rotate, said sleeve having projecting ears thereon, a hook carried by the ears, a foot or support carrying the sleeve, a nut with ears on opposite sides and applied to the screw stem, a foot or support carrying the nut, bars pivotally connected to the ears on opposite sides of the nut, hooks carried by the ends of the bars remote from the nut, the several hooks being adapted to engage a tire rim, and brackets or supports carried by the outer ends of the bars to in turn receive the corresponding portions of the wheel rim.

5. A tool for handling demountable tire rims, comprising a screw rod or stem formed at one end for the application of a turning tool, a sleeve on the rod adjacent to the tool receiving end thereof, a hook carried by the sleeve and adapted to engage over one edge of the tire rim, a foot or support carrying the sleeve, a nut carried by the screw rod and movable lengthwise thereof, a foot or support carrying the nut, bars connected to opposite sides of the nut and of a length to approach the tire rim in angular relation to the rod, brackets or supports carried by the outer ends of the bars, and a hook carried by each bar for engaging the tire rim to cause contraction of the rim by three-point engagement with the latter.

6. A tool for handling demountable rims, comprising a screw rod or stem having means at one end for turning the same by hand, a sleeve secured against longitudinal movement on the rod adjacent said end, a pivoted hook carried by said sleeve, a nut carried by said rod and movable lengthwise thereof, bars pivotally connected to the nut and of a length to bear at their outer ends against the inner side of the rim when expanding the latter, brackets or supports carried by the outer ends of the bars and engaging the lower edge of the rim, the sleeve also having a part for bearing against the inner side of the rim when expanding the same, the sleeve and the bars providing a three-point engagement with the rim, and a hook pivoted to the end of each bar, the hooks on the bars and the sleeve engaging with the rim when contracting the latter and being swung back out of the way when expanding the rim.

In testimony, that I claim the foregoing as my own, I have hereto affixed my signature in the presence of two witnesses.

THOMAS WALTER SLUTZ.

Witnesses:
GUY CHASE,
R. E. LANGE.